United States Patent [19]

Scheckenbach et al.

[11] Patent Number: 5,708,041
[45] Date of Patent: Jan. 13, 1998

[54] FOAMABLE MOLDING COMPOSITIONS

[75] Inventors: Helmut Scheckenbach, Langen; Axel Schönfeld, Wiesbaden; Siegfried Weis, Eppstein, all of Germany

[73] Assignee: Hoechst Aktiengesellschaft, Germany

[21] Appl. No.: 800,753

[22] Filed: Feb. 14, 1997

[30] Foreign Application Priority Data

Feb. 14, 1996 [DE] Germany ................ 196 05 359.5

[51] Int. Cl.⁶ ..................................... C08J 9/02
[52] U.S. Cl. .................. 521/77; 521/134; 521/138; 521/180; 521/183; 521/189
[58] Field of Search ............... 521/77, 180, 134, 521/138, 189, 183

[56] References Cited

U.S. PATENT DOCUMENTS 4,940,733  7/1990  Kuphal et al. ................ 521/77
5,486,543  1/1996  Shinada et al. .............. 521/77

*Primary Examiner*—Morton Foelak
*Attorney, Agent, or Firm*—Connolly & Hutz

[57] ABSTRACT

Molding compositions or mixtures comprising a high-temperature-resistant polymer and at least one polymer containing sulfoxide groups are used for the production of a foam by exposure to heat. The foam is employed for heat-resistant insulating layers.

6 Claims, No Drawings

FOAMABLE MOLDING COMPOSITIONS

The invention relates to a foamable molding composition based on a mixture of polymers containing sulfoxide groups and a high-temperature-resistant polymer, to a process for the production of foam by thermal treatment of the molding composition, and to the use of the molding composition.

Polymer compositions are usually foamed by adding a low-molecular-weight blowing agent which liberates gaseous elimination products at elevated temperature. However, high-temperature-resistant polymers can generally only be expanded very poorly using these conventional blowing agents since the temperature conditions are difficult to control.

The object was therefore to overcome said disadvantages.

The invention relates to a foamable molding composition which comprises

A) at least one high-temperature-resistant polymer,
B) at least one polymer containing sulfoxide groups in an amount of from 1 to 99% by weight (based on the total polymer content of the molding composition), and
C) if desired conventional additives.

Surprisingly, it has been found that a molding composition, i.e. a mixture of a thermally stable plastic, in particular a thermoplastically processable high-temperature-resistant polymer, with polymers containing sulfoxide groups readily forms a foam. On exposure to heat, the polymer containing sulfoxide groups decomposes, forming gases which result in expansion of the polymer composition. The high-temperature-resistant polymer is, for example, a thermoplastic, an engineering plastic or an engineering polymer. Examples of such polymers are polyether sulfones, polyarylene sulfides, polyetherimides, polyarylates, polyaryl ether ketones, polycarbonates, cycloolefin copolymers (COCs), polyimides, polyamideimides, liquid-crystalline polymers (LCPs), fluoropolymers, polyarylene ethers, and mixtures thereof.

The molding composition generally includes B) from 1 to 99% by weight (based on the total polymer content of the molding composition), preferably from 1 to 50% by weight, in particular from 3 to 20% by weight, of a polymer containing sulfoxide groups.

The term polymers containing sulfoxide groups is taken to mean polymers or oligomers which contain at least one arylene sulfoxide unit (—Ar—SO—; Ar=arylene). The arylenes are based, for example, on monocyclic or polycyclic aromatic compounds, which may be unsubstituted, monosubstituted or, polysubstituted. Examples thereof are phenylene, biphenylene (—$C_6H_4$—$C_6H_4$—), naphthylene, anthracene and phenanthrene. Examples of substituents are straight-chain, cyclic or branched $C_1$—$C_{20}$-hydrocarbon radicals, such as $C_1$-$C_{10}$-alkyl radicals, preferably methyl, ethyl, n-propyl, isopropyl, n-butyl, t-butyl and n-hexyl, and $C_6$-$C_{14}$-aryl radicals, preferably phenyl or naphthyl, or alternatively halogen atoms or sulfo, amino, nitro, cyano, hydroxyl, alkoxy or carboxyl groups.

Preferred polymers containing sulfoxide groups are polyarylene sulfide sulfoxides and polyarylene sulfoxides, in particular polyphenylene sulfide sulfoxide and polyphenylene sulfoxide, which can easily be prepared, for example, by oxidation of all or some of the sulfur groups in polyarylene sulfides using ozone or $NO_2/N_2O_4$. A sulfoxide content (based on all the sulfur-containing bridges in the polymer) of preferably at least 50%, in particular at least 95%, has proven favorable. Polyarylene sulfide sulfoxides are also taken to mean polyarylene sulfoxides below and are covered by the term polyarylene sulfoxides. The polyarylene sulfoxides can also contain sulfone groups. The preparation of polymers containing sulfoxide groups is described, for example, in German Patent Applications DE 4314735, DE 4314736, DE 4440010 and DE 19531163, which are incorporated herein by way of reference.

Engineering polymers are taken to mean plastics which have a melting point of above 100° C., in particular above 200° C. These are described, for example, in Ullmann's Encyclopedia of Industrial Chemistry, 5th Edition, VCH Verlagsgesellschaft mbH, Weinheim-New York 1992: organic fluoro polymers, Volume A11, pp. 393–430; polyamides, Volume A21, pp. 179–206; polycarbonates, Volume A21, pp.207–216; polyesters, Volume A21, pp. 227–252; polyimides, Volume A21, pp. 253–273; polymer blends, Volume A21, pp. 274–305; high-temperature-resistant polymers, Volume A21, pp. 449–472; polymethyl methacrylates, Volume A21, pp. 473–486; polyphenylene oxides, Volume A21, pp. 605–614; polyurethanes, Volume A21, pp. 665–716 and silicones, Volume A24, pp. 57–95, each of which is incorporated herein by way of reference.

Engineering plastics are described, for example, in G. W. Becker and D. Braun, "Kunststoff- Handbuch", Vol. 3/3, Carl Hanser Verlag, Munich 1994, which is incorporated herein by way of reference (1. polyarylates: pp. 1–53; 2. polyarylene sulfides: pp. 55–140; 3. polysulfones: pp. 141–217; 4. liquid-crystalline polyesters: pp. 219–258; 5. polyimides: pp. 263–293; 6. polyetherimides: pp. 297–335; 7. polyamideimides: pp. 337–356; 8. poly(aryl ether ketones): pp. 359–385).

Polycarbonates are described, for example, in "Encyclopedia of Polymer Science and Engineering", John Wiley & Sons, New York 1988, Vol. 11, pp. 648–718, which is incorporated herein by way of reference. Cycloolefin copolymers (COCs) are described in H. Cherdron, M. Brekner and F. Osan, Die Angewandte Makromolekulare Chemie (223), 121, (1994), which is incorporated herein by way of reference.

The molding composition or a mixture including at least one high-temperature-resistant polymer and at least one polymer containing sulfoxide groups can be converted into a plastic foam from a temperature of at least 300° C. The invention thus also relates to a process for the production of a foam by heating a mixture or molding composition which includes at least one high-temperature-resistant polymer and at least one polymer containing sulfoxide groups to a temperature of at least 300° C. The heat exposure time is generally from 5 to 60 minutes, preferably from 5 to 30 minutes.

The achievable foaming effect depends on the type of the polymer containing sulfoxide groups, in particular on the amount of sulfoxide groups, and on the proportion of the polymer containing sulfoxide groups in the polymer mixture. In addition, the foaming effect is dependent on the melt viscosity of the high-temperature-resistant polymer to be foamed and on the processing temperature.

For the purposes of foaming, the mixture or molding composition is generally heated in a temperature range of from 300° C. to 470° C. The temperature range depends on the structure of the polymer containing sulfoxide groups and on the melting point of the polymer to be foamed (high-temperature-resistant polymer) and can therefore also be outside said temperature range, for example below 300° C., i.e. up to about 250° C. If polyphenylene sulfoxide (sulfoxide Content at least 95%) is used, the foam-formation temperature is preferably in the range from 300° C. to 350° C. In accordance with the invention, the high-temperatureresistant polymer used can also be a mixture or blend of various high-temperature-resistant polymers, and the polymer containing sulfoxide groups can also be a mixture of various polymers containing sulfoxide groups.

The mixtures or molding compositions of the invention can contain conventional additives, such as thermal stabilizers, UV stabilizers, antistatics, flame retardants, dyes, pigments, inorganic and/or organic fillers (powders, fibers, etc.) or lubricant additives, such as molybdenum disulfide, graphite or polytetrafluoroethylene. When used in conventional amounts, there is no impairment of the physical or mechanical properties of the foams formed. In order to produce the foam, the polymer containing sulfoxide groups is expediently distributed as finely and uniformly as possible in the mixture or molding composition. This is achieved, for example, by using fine powders of the components. It is also possible to achieve good mixing by thermal processing, for example using commercially available compounders or extruders, preferably twin-screw extruders, at temperatures at which the polymer to be foamed melts. The multiphase blend formed can then be converted into pellets, granules or a powder in which there is no separation of the individual powder components and which thus enable uniform processing.

Thus, for example, when polyphenylene sulfoxide (sulfoxide content at least 95%) is used, an unfoamed molding composition can first be prepared at temperatures below 300° C. This unfoamed molding composition can then be converted into a foam, i.e. a foamed molding composition or a foamed molding, by thermal treatment at above 300° C.

In general, the foam formed has a density at least 50 percent lower than that of the unfoamed material.

The polymers containing sulfoxide groups, in particular those which do not melt at the processing temperatures, should likewise be employed as very fine powder in order to achieve a uniform foam.

In general, the mean particle sizes of the polymers A) and B) employed are in the range of from 0.3 to 500 μm, preferably of from 5 to 300 μm, in particular of from 5 to 100 μm.

The mean molecular weight of the polymers containing sulfoxide groups, expressed as the weight average $M_w$, is generally in the range of from 4,000 to 200,000 g/mol, preferably of from 10,000 to 150,000 g/mol, in particular of from 25,000 to 100,000 g/mol. The molding composition of the invention as such and the foam produced therefrom can be used for the production of moldings. In the former case, the molding composition is introduced into a closed mold and expanded therein, and the desired molding formed is removed from the mold. In the latter case, the molding composition is heated to give a foam having a dense, closed outer skin (structural foam), from which a molding is then produced by mechanical treatment (cutting, sawing or the like).

The moldings can be used as heavy-duty functional components, for example in aircraft construction, in automobile production and in electronics. Further uses of the moldings are in chemical apparatus construction. The foams or moldings can also serve as heat- and temperature-resistant insulating materials.

Advantages of the novel process for the preparation of foam-form high-temperature-resistant polymers are to be seen as no addition of low-molecular-weight blowing agents is necessary, the process can be carried out using simple technical means, foams of particularly low density are possible, and a broad degree of foaming and pore size range can be established.

EXAMPLES

1. Preparation of polyphenylene sulfoxide:

54.08 g of polyphenylene sulfide (®Fortron 0205 B4, Hoechst AG) were suspended in 300 ml of 99% dichloroacetic acid and 1 g of 95 to 97% sulfuric acid at 25° C. 46 g of $N_2O_4$ were subsequently added dropwise at a rate of 1 ml/minute with stirring, and the mixture was stirred at 50° C. for a further 2 hours, the polyphenylene sulfoxide formed dissolving after about 20 minutes. Some of the excess $N_2O_4$ escaped in gas form during the stirring. The remaining $N_2O_4$ in solution was expelled with the aid of a capillary with nitrogen gas for 1 hour at 50° C. In order to precipitate the product, the solution was mixed with 4 liters of demineralized water with vigorous stirring, and the product was filtered off and dried. ESCA analysis of the product showed that about 98% of the sulfur groups in the polyphenylene sulfide employed had been converted into sulfoxide groups (polyphenylene sulfoxide with a sulfoxide content of 98%). The density of the polyphenylene sulfoxide was 1.40 g/cm³.

In Examples 2 to 8, the polyphenylene sulfoxide from Example 1 and the engineering polymer employed were each ground finely.

2–7. A powder mixture of the commercially available high-temperature-resistant polymer A) and polyphenylene sulfoxide B) were introduced into an aluminum dish (4.0 cm×4.0 cm) and treated for the stated times and temperatures in a closed oven. In each case, a foam formed having a dense, closed outer skin (structural foam). The density of the foam formed and of the polymer employed are shown in the table. The foams each exhibited the expected temperature resistance of the polymers employed.

| Example | 2 | 3 | 4 | 5 | 6 | 7 |
| --- | --- | --- | --- | --- | --- | --- |
| Comp. A) | Ultrason E2010 | Ultrason S2010 | Ultem 1010 | Makrolon 2600PC | Apec HT KU 1-9351 | PEEK 450 G |
| Amount [g] | 10.3 | 13 | 12 | 13 | 13 | 13 |
| Comp. B) Amount [g] | 1.8 | 2.3 | 1.8 | 2.5 | 3.0 | 3.5 |
| Foaming temperature [°C.] | 325 | 325 | 325 | 325 | 325 | 450 |
| Time [min] | 13 | 11 | 20 | 10 | 10 | 13 |
| Foam density [g/cm³] | 0.59 | 0.23 | 0.58 | 0.27 | 0.25 | 0.55 |
| Density A) [g/cm³] | 1.37 | 1.24 | 1.27 | 1.2 | 1.15 | 1.30 |

® Ultrason = polyether sulfone from BASF AG, Ludwigshafen, Germany
® Ultem = polyetherimide from General Electric, Rüsselsheim, Germany
® Makrolon = polycarbonate from Bayer AG, Leverkusen, Germany
® Apec = polyacrylate from Bayer AG, Leverkusen, Germany
® PEEK = polyether ether ketone from Victrex Deutschland GmbH, Hofheim.

8. 90 parts by weight of ®Vectra A 950 (liquid-crystalline polyester from Hoechst AG, Frankfurt, Germany) and 10 parts by weight of polyphenylene sulfoxide were mixed with one another in a twin-screw compounder (LSM 30.34 from Leistritz GmbH, Nuremberg, Germany) at a material temperature of 280° C. without foam formation; during this operation, the Vectra melted, but the polyphenylene sulfoxide did not. The molding composition was subsequently granulated and dried. The granules were then converted into a foam in a Polystat 200 S press from Schwabenthau, Berlin. To this end, about 61 g of the granulated mixture were introduced into a cylindrical mold (diameter 120 mm) with adjustable height (lid height-adjustable through loose fit). The filled mold was placed under the press and heated to about 300° C. This temperature was maintained for 25 minutes at a pressure of 8 bar. The mold was subsequently cooled, and the foamed molding was removed. The product had a closed surface and a density of 0.55 g/cm$^3$ (for comparison: density of Vectra A950 is 1.40 g/cm$^3$).

We claim:

1. A process for the production of a polymer foam, comprising the step of heating a molding composition comprising A) at least one high-temperature-resistant polymer, B) at least one polymer, different from (A) containing surfoxide groups in an amount of from 1 to 99% by weight, based on the total polymer content of the molding composition, and C) optionally conventional additives to a temperature in the range from 300° C. to 470° C.

2. The process as claimed in claim 1, wherein the temperature is in the range of from 300° C. to 350° C.

3. The process as claimed in claim 1, wherein the heating is carried out for a time period of from 5 to 60 minutes.

4. The process as claimed in claim 1, wherein the heating is carried out for a time period of from 5 to 30 minutes.

5. The process as claimed in claim 1, wherein the polymer foam formed has a density at least 50 percent lower than that of the unfoamed material.

6. Method for the preparation of moldings by shaping a foam as produced according to claim 1 to give said molding.

* * * * *